INVENTORS:
HANS BRAUER
ALFONS GOEKE

United States Patent Office 3,350,921
Patented Nov. 7, 1967

3,350,921
APPARATUS FOR TESTING TUBES
Hans Brauer and Alfons Goeke, Solingen, Germany, assignors to Th. Kieserling & Albrecht, Solingen, Germany
Filed Jan. 22, 1965, Ser. No. 427,390
Claims priority, application Germany, Jan. 22, 1964, K 51,904
8 Claims. (Cl. 73—49.6)

ABSTRACT OF THE DISCLOSURE

Apparatus for testing the integrity of open-ended tubes having different diameters wherein the ends of tubes are engaged by sealing elements provided on differential pistons portions of which are reciprocable in stationary cylinders. Each piston has three surfaces, each of which is located in a different chamber in the interior of the respective cylinder. One of the chambers receives oil at a pressure which corresponds to pressure of testing fluid in the pipe, and such oil tends to move the respective sealing element away from the pipe. The other two chambers of each cylinder receive oil which tends to maintain the sealing elements in engagement with the pipe. Valves are provided to insure that the ratio of oil pressure which maintains the sealing elements in engagement with the pipe to the pressure of testing fluid remains unchanged not only when the pipe is actually tested but also during build-up and reduction of the pressure of testing fluid.

---

The present invention relates to a method and apparatus for testing tubes and similar hollow cylindrical objects. More particularly, the invention relates to a method and apparatus for determining the presence or absence of leaks and other defects in metallic tubes, plastic tubes and similar hollow objects by means of a testing fluid.

Open-ended metallic tubes are tested for integrity by sealing their ends and by admitting into their interior a testing fluid whose pressure is measured to determine the presence or absence of leaks and other defects. Such defects will exist if the pressure of entrapped testing fluid decreases. The sealing action may be furnished by subjecting the ends of a tube to radial (squeezing) and/or axial (compressive) stresses. The magnitude of such sealing stresses must be accurately related to the pressure of testing fluid for the following reasons: Manufacturers of precision-finished tubes consisting of steel, copper, brass or other metallic materials must produce such tubes in a variety of sizes and wall thicknesses. Thus, many types of metallic tubes must be furnished in sizes whose diameters and wall thicknesses differentiate from each other by as little as 1 mm. If a thin-walled large-diameter tube consisting of copper, brass or other nonferrous metal is to be tested for integrity while its ends are sealed by the application of axial stresses, the magnitude of such axial stresses must be controlled with utmost accuracy to avoid buckling or damage to the sealing elements, i.e., such axial stresses should be just large enough to insure satisfactory sealing of ends while the interior of the thin-walled tube receives a supply of pressurized testing fluid.

Accordingly, it is an important object of the present invention to provide a novel method of testing metallic or other tubes for the presence or absence of leaks and other defects according to which the sealing pressures are invariably related to and controlled in dependency on the pressure of testing fluid to avoid buckling, uncontrolled leakage of testing fluid at the ends of a tube, losses in energy and/or excessive wear on the sealing elements.

Another object of the invention is to provide a method of the just outlined characteristics according to which the sealing pressures are infinitely adjustable and are controlled with utmost accuracy not only during but also prior and subsequent to actual testing operation.

A further object of the invention is to provide a method of testing the integrity of rigid cylindrical tubes and similar hollow bodies in such a way that the open ends of such bodies are properly sealed during a testing operation regardless of whether the sealing action results in response to application of axial or radial stresses.

An additional object of our invention is to provide a novel apparatus for testing metallic tubes of ferrous or nonferrous material and to construct the apparatus in such a way that it can be used for determining the integrity of thin-walled, thick-walled, small-diameter and/or large-diameter tubes, and that it can determine the integrity of such bodies in a fully automatic way.

A concomitant object of the invention is to provide a novel hydraulic testing and sealing circuit which may be utilized in an apparatus of the just outlined character and to construct and assemble the component parts of the hydraulic circuit in such a way that the magnitude of sealing stresses depends from the pressure of testing fluid in all stages of a testing operation to avoid buckling or other damage to the tubes at the time they offer comparatively little or comparatively large resistance to such deformation.

Still another object of the invention is to provide an apparatus which may be utilized for determining the integrity of tubes consisting of different materials and which can be manipulated by persons requiring comparatively little technical skill.

A further object of our invention is to provide an apparatus wherein the testing and/or sealing pressure may be regulated with utmost precision and with greater precision than in conventional apparatus which are being used for similar purposes, wherein the elements which actually seal the ends of a tube may be fed or retracted at different speeds and in response to circulation of small quantities of hydraulic fluid, and wherein such hydraulic fluid may be conveyed through relatively weak and hence inexpensive conduits of small diameter.

Another object of the invention is to provide an apparatus wherein the ratio between the pressures of the testing and sealing fluids may be regulated within a wide range, wherein all such regulatory steps can be carried out by resorting to simple, compact and readily available control elements, and wherein all such control elements occupy little room so that the entire apparatus may constitute a compact unit which can be mounted in a conveying system serving to advance tubes from the point of manufacture to storage or to another destination.

Briefly stated, one feature of our invention resides in the provision of a method of testing tubes, particularly of testing thin-walled metallic tubes consisting of steel or nonferrous metal. The method comprises the steps of sealing the ends of an open-ended tube by the application of hydraulic sealing pressure which acts axially or radially inwardly, i.e., in the direction of one dimension of the tube, so as to subject the ends to compressive or squeezing stresses, introducing into the tube water or another suitable testing fluid and gradually increasing the pressure of such testing fluid to a predetermined value, measuring the pressure of fluid in the tube to determine the presence or absence of leaks or other deficiencies, reducing the pressure of testing fluid, adjusting the sealing pressure whenever necessary so that the ratio of sealing pressure to be pressure of testing fluid remains unchanged, and releasing the tube so that a defective tube may be ejected from its conveyor or that a satisfactory tube may be conveyed on to the next station. A suitable conveyor on which the tubes may be advanced seriatim through and past a testing station is disclosed in the copending application Ser. No. 391,429 of Hans Pfeiffer, filed on Aug. 24, 1964, and assigned to the same assignee. It will be seen that the tubes may be advanced by an intermittently operated rotary conveyor and are tested during intervals between consecutive movements of the conveyor. All defective tubes are ejected in response to signals produced by the testing apparatus.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawings, in which:

Figure 1:
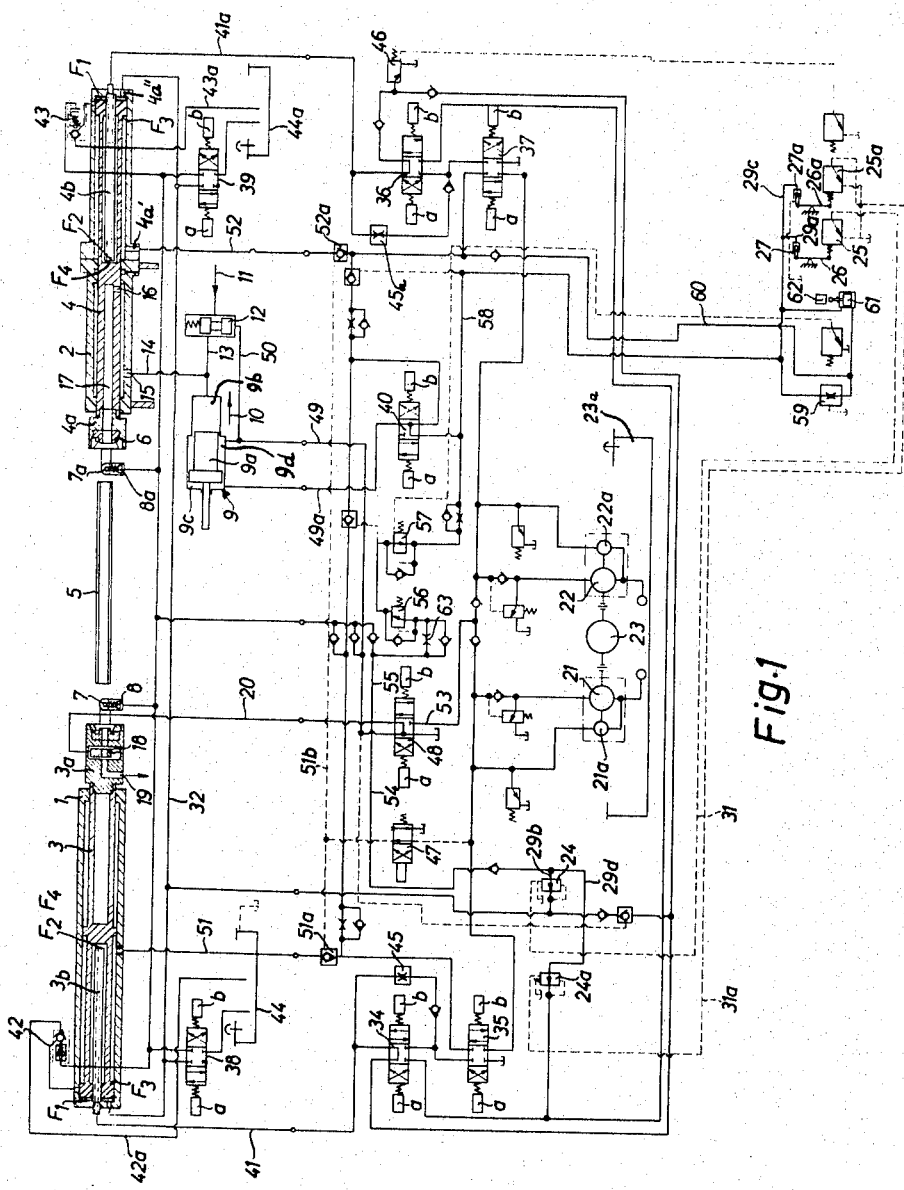
FIG. 1 is a diagram of the hydraulic circuit in an apparatus which embodies one form of our invention, the components of the unit which seals the ends of tubes during a testing operation being shown in axial section.

Referring first to FIG. 1, there is shown an apparatus for testing metallic tubes 5. This apparatus comprises a sealing unit including two axially spaced outer hydraulic cylinders, 1, 2 which respectively accommodate differential pistons, 3, 4 having sealing heads 3a, 4a. These sealing heads are movable in sealing engagement with the corresponding end faces of the tube 5 so that, during testing, the tube is subjected to axially oriented (compressive) sealing stresses. The heads 3a, 4a are provided with annular sealing gaskets 6 which come in actual contact with the respective end faces of the tube 5.

Figure 4:
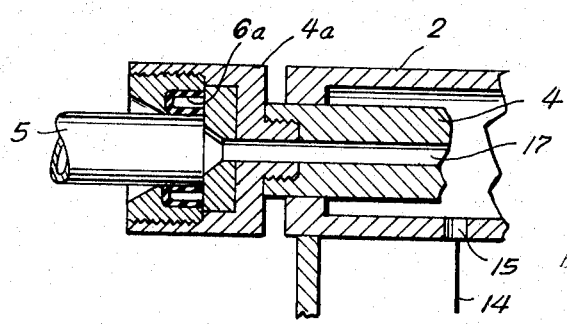
FIG. 4 is a fragmentary axial section through a portion of a modified sealing unit.

As previously stated, the sealing heads 3a, 4a may be replaced by heads having sealing sleeves 6a one of which is shown in FIG. 4 and which may be slipped onto the respective ends of the tube to subject such ends to radially inwardly oriented sealing stresses.

The sealing heads 3a, 4a carry or are otherwise combined with suitable control elements 7, 7a which serve to limit the rapid working stroke of pistons 3, 4 toward the ends of the tube 5 when the tube is properly inserted between the cylinders 1, 2. In the illustrated embodiment, each of the control elements 7, 7a comprises a source of light and a photoelectric cell. These control elements are reciprocable by hydraulic cylinder and piston units 8, 8a so as to be moved out of the way and to be protected against contamination in the course of a testing operation.

The tube 5 is tested with water or another hydraulic testing fluid whose pressure is regulated by a pressure transmitting cylinder 9 containing a piston 9a which is reciprocable in and counter to the direction indicated by an arrow 10 to subject the testing fluid in the interior of the tube 5 to requisite pressure. Such testing fluid is admitted through a supply conduit 11 which contains a filling slide valve 12 and feed conduits 13, 14, the latter delivering testing fluid to a radial port 15 of the cylinder 2. Fluid entering the port 15 flows through a second radial port 16 in the piston 4, through an axial bore 17 of this piston, and thorugh an axial bore of the sealing head 4a.

The fluid which has been used for testing of the tube 5 may be evacuated through an axial bore of the sealing head 3a, through a spring-biased slide valve 18, and through an outlet 19. In FIG. 1, the slide valve 18 is shown in open position in which it allows testing fluid to escape through the outlet 19. This valve may be closed against the bias of its spring in response to admission of oil or another hydraulic fluid through a conduit 20. As soon as the valve 18 closes, the testing fluid remains entrapped in the tube 5 (provided that the sealing heads 3a, 4a engage the respective ends of this tube) and also fills the cylinder chamber 9b at the right-hand side of the piston 9a, as the parts appear in FIG. 1.

Figure 2:
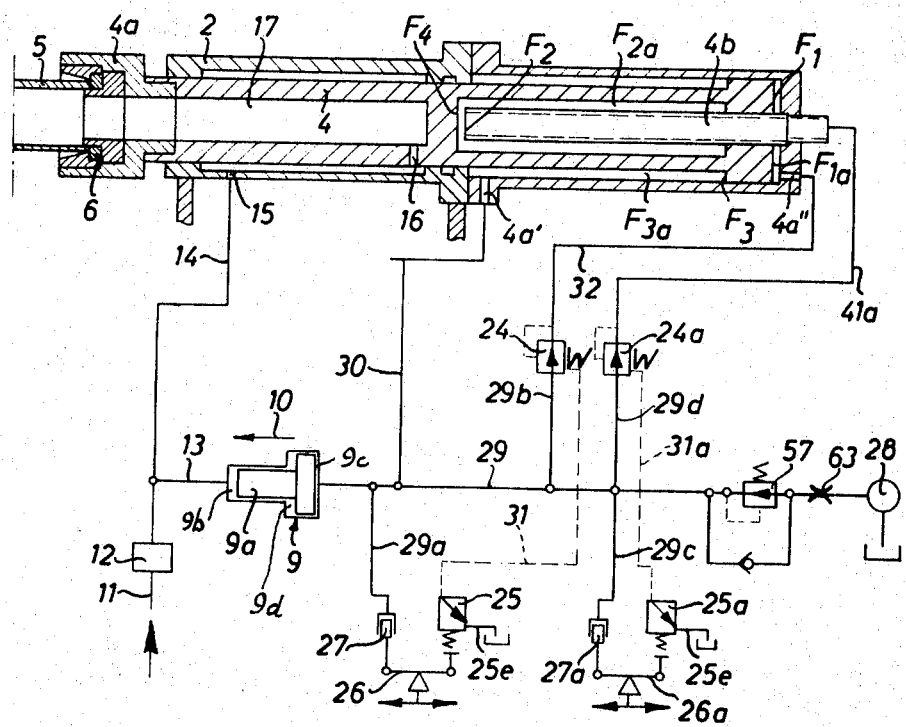
FIG. 2 is a fragmentary diagrammatic view of a somewhat simplified hydraulic circuit, one outer cylinder of the sealing unit being drawn to a larger scale and being shown in axial section.

The hydraulic sealing fluid (e.g., oil) which is used to move the pistons 3, 4 in the cylinders 1, 2 is circulated by two groups of pumps 21, 21a and 22, 22a which are driven by a single electric motor 23. As shown in FIG. 2, the piston 4 has three effective surfaces $F_1$, $F_3$ and $F_4$ and constitutes a cylinder for a hollow plunger 4b which has an effective surface $F_2$. The plunger 4b is fixed to the cylinder 2 and its surface $F_2$ allows for precise adjustment of sealing stresses. The construction of the piston 3a and its plunger 3b is analogous (see FIG. 1).

FIG. 2 shows a simplified version of the hydraulic circuit, and it will be noted that the chamber $F_{3a}$ receives oil through a radial port 4a' of the cylinder 2. Such oil also serves to exert pressure against the piston 9a in the chamber 9c of the cylinder 9, i.e., to raise the pressure of the testing fluid flowing from the supply conduit 11 and on through the ports 15, 16 and bore 17 into the interior of the tube 5. Such oil is circulated by a pump 28 and flows through conduits 29, 30 the latter of which discharges into the port 4a'. The chamber $F_{3a}$ of the cylinder 1 receives oil in similar fashion. It will be seen that the port 4a' is sealed from the port 15.

The chambers $F_{1a}$ and $F_{2a}$ which respectively terminate at the effective surfaces $F_1$ and $F_4$ of the piston 4 receive oil through pressure reducing valves 24, 24a and regulating valves 25, 25a. The valve 24 discharges into a conduit 32 which is connected to a port 4a'' of the cylinder 2, and the valve 24a discharges into a conduit 41a which is connected to the outer end of the plunger 4b. This plunger is hollow so that oil issuing from the conduit 41a may enter the chamber $F_{2a}$. The chamber $F_{1a}$ receives oil through the port 4a''.

The valves 25, 25a are controlled by adjustable two-armed levers 26, 26a which are rockable by hydraulic cylinder and piston units 27, 27a. These units may be actuated by oil flowing through conduits 29a, 29c branching from the conduit 29.

Figure 3:
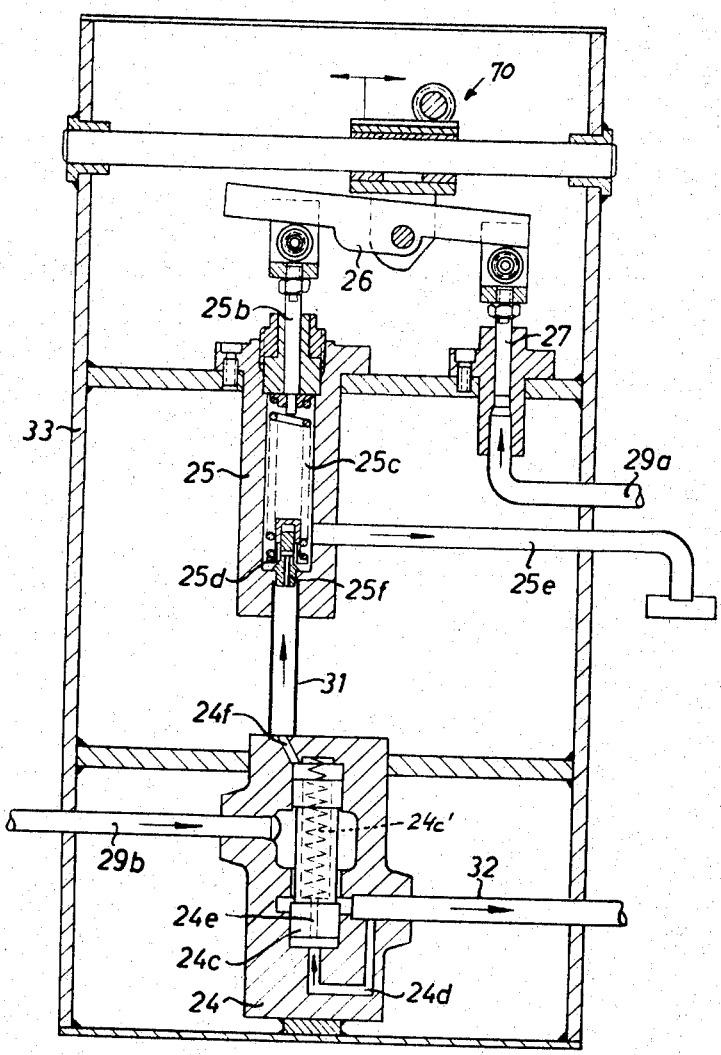
FIG. 3 is an enlarged, axial section through a detail of the hydraulic circuit shown in FIG. 1 or 2.

FIG. 3 shows that the valves 24, 25 are assembled in a valve housing 33 which also accommodates the lever 26. A similar housing is provided for the valves 24a, 25a and lever 26a. The pumps 21, 21a and 22, 22a respectively deliver oil which is used to reciprocate the pistons 3, 4. The remaining operations are controlled by oil which is circulated by all of the pumps 21–22a.

The apparatus of our invention is operated as follows:

*Rapid feed of sealing heads*

In order to rapidly advance the sealing heads 3a, 4a into sealing engagement with the ends of the tube 5, i.e., to rapidly move the pistons 3, 4 toward each other, the operators start the motor 23 to operate the pumps 21, 21a, 22, 22a (in FIG. 2, the single pump 28 corresponds to the pumps 21–22a of FIG. 1). The pumps 21–22a then deliver oil from the sump 23a. In the next step, the electrical control system of the apparatus energizes the solenoid b of a valve 34, the solenoid a of a valve 35, the solenoid b of a valve 36, the solenoid b of a valve 37, the solenoid a of a valve 38, the solenoid a of a valve 39, and the solenoid b of a valve 40. Oil is now free to flow through conduits 41, 41a and into the chambers $F_{2a}$ of the cylinders 1, 2 to exert a pressure against the surfaces $F_2$ and $F_4$ whereby the pistons 3, 4 move toward each other and expel oil from the chambers $F_{3a}$. Such oil flows through the conduits 51, 52 (corresponding to the conduit 30 of FIG. 2) and valves 35, 37 to return into the sump 23a by passing through one-way valves 51a, 52a. The valves 51a, 52a open in response to oil pressure in a conduit 51b. At the same time, the chambers $F_{1a}$ of the cylinders 1, 2 receive oil via one-way valves 42, 43 and conduits 42a, 43a. Such oil is sucked from tanks 44, 44a because the volume of the chambers $F_{1a}$ increases while the pistons 3, 4 perform a working stroke. The cylinder and piston units 8, 8a are sealed from the source of compressed oil by valves 38, 39 so that the control elements 7, 7a may move to operative positions.

Slow feed of sealing heads

Once the control elements 7 7a assume such operative positions, the speed of pistons 3, 4 is reduced. This is due to the fact that elements 7, 7a send impulses which deenergize the solenoids, b, b, a, a, of the valves 34, 36, 38, 39. Oil flows through throttling devices 45, 45a and conduits 41, 41a into the chambers $F_{2a}$ of the cylinders 1, 2. A pressure regulating valve 46 (shown to the right of of the valve 36 in FIG. 1) determines the pressure which is exerted by the heads 3a, 4a against the respective ends of the tube 5. Such pressure also determines the sealing action of the gaskets 6 in the heads 3a, 4a.

Rinsing and filling of the tube

In order to admit testing fluid into the tube 5, the control system of the apparatus energizes the solenoids a, b, a, a, of the valves 35, 37, 48, 40 and the valve 47. At the same time, the filling slide valve 12 opens in response to admission of oil through conduits 49, 50. The oil flowing through the conduit 49 enters a chamber 9d of the cylinder 9 and presses against the piston 9a in a sense to move this piston in a direction to the left, as viewed in FIG. 1, i.e., into the left-hand end position. Testing fluid is free to flow through conduits 13, 14, ports 15, 16, bore 17 and into the interior of the tube 5 whose ends are properly sealed by the heads 3a, 4a. Such testing fluid can flow through the head 3a and escapes through the outlet 19 because the slide valve 18 is open, i.e., the testing fluid merely rinses the tube 5. The cylinder and piston units 8, 8a receive compressed oil so that the control elements 7, 7a are moved out of their operative positions. At the same time, testing fluid flowing in the conduit 13 fills the right-hand chamber 9b of the cylinder 9.

Building up the pressure of testing fluid

The pressure of testing fluid in the tube 5 is raised by deenergizing the solenoids of all aforementioned valves and by energizing the solenods a, a, b of valves 36, 34, 48. This closes the slide valve 18 in the sealing head 3a and the filling slide valve 12 in the conduit 11. The valve 40 admits compressed oil into the conduit 49a which leads to the left-hand chamber 9c of the cylinder 9 so that the piston 9a moves in the direction indicated by the arrow 10 and compresses the testing fluid in the chamber 9b. At the same time, oil is free to flow through conduits 51, 52 and into the chambers $F_{3a}$ of the cylinders 1, 2 to impinge against the surfaces $F_3$ of the pistons 3, 4. Oil also flows through the conduit 53 and valve 48 (whose solenoid b is energized) to enter conduits 54, 29b, 29d leading to the pressure reducing valves 24, 24a. Conduit 55, valves 56, 57, conduit 58 and conduits 29a, 29c admit compressed oil to the cylinder and piston units 27, 27a so that the levers 26, 26a are rocked to transmit a certain pressure to the rods 25b (see FIG. 3) which control the bias of springs 25c. The springs 25c serve to bias valve members 25d which bear against conical valve seats 25f of the regulating valves 25. The oil flowing through the conduits 29b, 29d flows through the valves 24, 24a, through conduits 32, 41, 41a and into the chambers $F_{1a}$, $F_{2a}$ of the cylinders 1, 2. Pressures begin to rise in the chambers $F_{1a}$, $F_{2a}$, $F_{3a}$ of both cylinders 1, 2 and at the primary side of the piston 9a to bring about a pressure rise in the conduits 31, 31a. When the last named pressure rises to a predetermined value, the valve members 25d in the valves 25, 25a move away from the seats 25f so that oil can escape via return conduits 25e (see FIG. 3). However, and since the pressure of oil in the conduit 32 continues to rise, the pressure also rises beneath the piston-like valve members 24c of the valves 24, 24a (see the bypass conduit 24d in FIG. 3 which connects the conduit 32 with the space at the underside of the valve member 24c). The valve members 24c begin to move against the bias of springs 24c' and seal the conduits 29b, 29d from the conduit 32. Consequently, the conduit 32 ceases to admit oil into the chambers $F_{1a}$ of the cylinders 1, 2 to prevent further buildup of sealing pressure.

It will be seen that the pressures in conduits 29a, 32 and in the chambers which are connected thereto can be selected at will, and that the predetermined relationship between such pressures remains constant. Such preselected relationship between the sealing pressure and the pressure of testing fluid remains unchanged not only while the tube 5 is actually tested but also at the time the apparatus builds up the testing pressure. This will be readily understood since any rise in pressure prevailing in the conduit 29a will cause greater compression of the spring 25c in the regulating valve 25 and the valve member 25d moves against the seat 25f to reduce the flow of oil from the conduit 31 to the conduit 25e. This again results in increasing pressure of oil in the conduit 32 and in the chambers $F_{1a}$ which are connected thereto.

The areas of the effective surfaces $F_1$, $F_2$, $F_3$ are different and the pressures acting upon such surfaces are selected in such a way that the sealing gaskets 6 are invariably subjected to pressures which are just sufficient to insure satisfactory sealing of both ends of the tube 5.

Testing of the tube

The desired testing pressure is selected by adjustment of the valve 57 shown to the left of the valve 40 in FIG. 1. Once this pressure is reached, the control system of the apparatus energizes the solenoid a of the valve 40 so that oil which was flowing through the conduit 49a and on to the chamber 9c of the cylinder 9 must pass through the conduit 58, a metering or throttling device 59 and a conduit 60 to flow back to the valve 40. The quantity of oil passing through the throttling device 59 is such as to compensate for normal losses due to leakage which cause the piston 9a to move in the direction indicated by the arrow 10. If the tube 5 is leaky or if a gasket 6 fails to provide a satisfactory sealing action, pressure in the conduit 60 drops. This conduit delivers oil to one side of a trip 61 whose other side receives oil from the conduit 58. The trip 61 normally closes a limit switch 62 which sends an impulse to eject a defective tube 5 when the pressure in the conduit 60 drops to indicate that the tube which is being tested is leaky. The ejecting device is shown in the aforementioned copending application Ser. No. 391,429 of Pfeiffer.

Despite the fact that the length of the tube 5 decreases during testing and/or that the length of the apparatus also changes, the heads 3a, 4a must insure satisfactory sealing of tube ends during the entire testing operation. Such compensatory movements of sealing heads 3a, 4a are insured by the pressure reducing valves 24, 24a and by the aforedescribed connection of these valves into the hydraulic circuit of the apparatus. Thus, the arrangement is such that the chambers $F_{1a}$ and $F_{2a}$ of the cylinders 1, 2 receive additional oil to compensate for a shortening of the tube 5 in response to compressive stresses which result from the sealing action of the heads 3a, 4a.

Reducing the pressure of testing fluid

In the first step, the solenoids a, b of the valves 40, 48 are deenergized. This reduces the pressures of oil in the chambers $F_{3a}$, 9c and in the conduits 29a, 29c because such oil can escape through the valve 40, a throttle valve 63 and valve 48. The pressure of testing fluid in the tube 5 is now reduced.

As explained above, the sealing pressure should be reduced proportionally to a drop in the pressure of testing fluid, i.e., the oil pressure prevailing in the chambers $F_{1a}$, $F_{2a}$ should decrease in response to decreasing pressure of oil in the chambers $F_{3a}$ and 9c. This is insured in accordance with our invention because the oil may escape through conduits 32, 41 and 41a and via valves 24, 24a (which seal the passage of the main oil stream) by flowing through bypass conduits 24d and bores 24e, 24f shown in FIG. 3 into the conduits 25e and back to the sump.

The flow of oil through the regulating valves 25, 25a is made possible because the valve members 25d are biased by oil flowing through the conduits 31, 31a (see FIG. 3) so that such oil opposes the bias of the spring 25c and the pressure of the rod 25b, i.e., oil in the conduits 31, 31a opposes the pressure of oil in the conduit 29a which is made to bear against the rod 27 and tends to rock the lever 26 in a counterclockwise direction, as viewed in FIG. 3. This insures that the desired relationship between the sealing pressure and the pressure of testing fluid remains unchanged at the time the pressure of testing fluid decreases.

*Disengaging the tube*

The tube 5 is disengaged in response to movement of pistons 3, 4 away from each other. The control system energizes the solenoid a of the valve 37 and the solenoids b of the valves 36, 39, 35, 34, 38 and 40. Compressed oil flows through the conduits 51, 52 and on to the chambers $F_{3a}$ of the cylinders 1 and 2. The oil which is expelled from the chambers $F_{2a}$ in response to return movement of the pistons 3, 4 flows through the conduits 41, 41a, and all such oil which is simultaneously expelled from the chambers $F_{1a}$ flows through the conduit 32 and the valves 38, 39 back to the tanks 44, 44a.

The apparatus of our invention may be used with particular advantage for testing of tubes whose ends are sealed by application of compressive stresses, i.e., by resorting to sealing heads 3a, 4a whose gaskets 6 bear against the end faces of the tube 5. Such heads may be so designed that they may be utilized in connection with testing of tubes whose diameter may vary within a wide range, e.g., between 70 and 120 mm. In other words, neither the heads 3a, 4a nor the gaskets 6 must be replaced if the apparatus was used for testing of tubes having a diameter of say 70 mm. and is then converted for testing of tubes with a diameter of say 120 mm.

On the other hand, radially acting sealing sleeves bring about the advantage that the axial length of tested tubes remains unchanged because the sealing action results from the application of radially oriented compressive stresses. Thus, the gaskets are subjected to less wear and can stand longer periods of actual use.

An important feature of the hydraulic circuit shown in FIG. 1 or 2 is that it comprises separate assemblies for the generation and application of sealing and testing pressures as well as means for maintaining the ratio between such pressures regardless of unexpected changes in testing pressure such as will arise when a tube leaks or when the ends of a tube are improperly sealed so that the testing fluid escapes along the gaskets 6.

The pressure prevailing in the chambers $F_{3a}$ and $9c$ is utilized to regulate the pressure of testing fluid which corresponds to pressure prevailing in the chamber $9b$. The pressure prevailing in the chambers $F_{1a}$, $F_{2a}$ determines the sealing pressure and is regulated by valves 24, 24a, 25, 25a. The areas of surfaces $F_1$, $F_2$, $F_3$ are different from each other and the position of levers 26, 26a may be adjusted with great accuracy by worm drives 70 one of which is shown in FIG. 3. Such worm drives will adjust the effective length of the two arms of the levers 26, 26a.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for testing the integrity of open-ended tubes and similar hollow tubular objects having different diameters by a hydraulic testing fluid, comprising a sealing unit including a pair of axially spaced outer cylinders each having three separate chambers, a pair of differential pistons each having a portion reciprocable in one of said cylinders and each having three surfaces each of which is located in a different chamber of the corresponding cylinder, and a sealing member secured to the reciprocable portion of each of said pistons and having means for sealingly engaging one end of a tube which is placed between said cylinders; conduit means for admitting testing fluid through one of said cylinders and the corresponding sealing member so that such testing fluid fills the interior of the tube; and a hydraulic circuit including first pressure generating means for compressing the testing fluid in said conduit means by means of a hydraulic fluid so that testing fluid escapes from a leaky tube and the pressure of such testing fluid drops accordingly, said first pressure generating means comprising means for admitting hydraulic fluid into one chamber of each cylinder at a pressure which is proportional to the pressure of testing fluid so that hydraulic fluid exerts against the surfaces of said pistons a pressure tending to move the pistons away from sealing engagement with the tube, second pressure generating means for admitting compressed hydraulic fluid into the remaining chambers of each cylinder so that such hydraulic fluid bears against the corresponding surfaces of said pistons and produces a sealing pressure which maintains said sealing members in engagement with the tube in opposition to fluid pressure in said one chamber of each cylinder, and valve means for regulating the pressure in said remaining chambers in response to changes in the pressure of testing fluid so that the ratio between said sealing pressure and the pressure of testing fluid remains constant during the buildup, retention and reduction of pressure of testing fluid.

2. An apparatus as set forth in claim 1, wherein the area of each surface is different from the areas of the remaining surfaces on each of said differential pistons.

3. An apparatus as set forth in claim 1, wherein each of said pistons comprises a hollow cylinder member which is reciprocable in the corresponding outer cylinder and wherein said apparatus further comprises a plunger fixedly secured to each outer cylinder and extending into the respective cylinder member, one of said chambers being provided in the interior of said cylinder member.

4. An apparatus as set forth in claim 1, wherein each of said pistons comprises a hollow cylinder member which is connected to the corresponding sealing member and is reciprocable in the respective outer cylinder, and further comprising two plungers each extending into one of said cylinder members and fixed to the respective outer cylinder.

5. An apparatus as set forth in claim 1, wherein said sealing members are heads which are movable into compressive sealing engagement with the end faces of the tube.

6. An apparatus as set forth in claim 1, wherein said hydraulic circuit further includes means for producing an impulse in response to detection of a defective tube.

7. An apparatus as set forth in claim 1, wherein said valve means comprises pressure reducing valve means, adjustable regulating valve means connected with said pressure reducing valve means, rockable lever means for adjusting said regulating valve means, cylinder and piston means for rocking said lever means, and conduit means connecting said cylinder and piston means with said first pressure generating means.

8. An apparatus as set forth in claim 1, wherein said first pressure generating means comprises a cylinder member provided in said conduit means, a piston member reciprocable in said cylinder member, and valved conduit means for admitting compressed hydraulic fluid to one side of said piston member so that the other side of the piston member compresses the testing fluid.

References Cited

UNITED STATES PATENTS

| | | | |
|---|---|---|---|
| 1,851,345 | 3/1932 | Brown et al. | 73—49.1 X |
| 2,684,590 | 7/1954 | Lassman | 73—49.6 |
| 2,696,107 | 12/1954 | Blaing-Leisk | 73—45.2 |
| 2,705,888 | 4/1955 | Sedgwick | 73—49.6 |
| 2,883,859 | 4/1959 | Merrill | 73—49.6 |
| 2,896,445 | 7/1959 | McNabb | 73—49.6 |

LOUIS R. PRINCE, *Primary Examiner.*

JEFFREY NOLTON, *Assistant Examiner.*